United States Patent
Emrani et al.

(10) Patent No.: US 10,703,308 B2
(45) Date of Patent: Jul. 7, 2020

(54) INTEGRATED FLAT WIRE POWER DISTRIBUTION SYSTEM FOR A VEHICLE

(71) Applicant: Ford Global Technologies, LLC, Dearborn, MI (US)

(72) Inventors: Amin Emrani, New York City, NY (US); Paul J. Nicastri, Dearborn, MI (US); Senate Ghanim, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 260 days.

(21) Appl. No.: 15/729,444

(22) Filed: Oct. 10, 2017

(65) Prior Publication Data

US 2019/0106067 A1    Apr. 11, 2019

(51) Int. Cl.
| | | |
|---|---|---|
| *B60R 16/03* | (2006.01) | |
| *H02H 7/12* | (2006.01) | |
| *H02M 3/156* | (2006.01) | |
| *B60R 16/033* | (2006.01) | |

(52) U.S. Cl.
CPC ............ *B60R 16/03* (2013.01); *B60R 16/033* (2013.01); *H02H 7/12* (2013.01); *H02M 3/156* (2013.01)

(58) Field of Classification Search
CPC ... B60R 16/03; B60R 16/033; B60R 16/0207; B60R 16/02; H02M 3/156; H02H 7/12; H02H 7/261; H02H 3/08; H02H 3/006
See application file for complete search history.

(56) References Cited

U.S. PATENT DOCUMENTS

| | | | | |
|---|---|---|---|---|
| 5,010,642 | A * | 4/1991 | Takahashi | H01B 13/01254 140/147 |
| 6,396,137 | B1 * | 5/2002 | Klughart | H01L 25/16 257/691 |
| 10,284,106 | B1 * | 5/2019 | Vinciarelli | H02M 7/003 |
| 2008/0294916 | A1 * | 11/2008 | Moussaoui | G06F 1/26 713/300 |
| 2009/0314561 | A1 * | 12/2009 | Handa | F02N 11/0866 180/65.25 |
| 2013/0229050 | A1 | 9/2013 | Shipley et al. | |

(Continued)

FOREIGN PATENT DOCUMENTS

WO    WO-2017222069 A1 *  12/2017  ........... B60R 16/033

OTHER PUBLICATIONS

Amin Emrani et al. *Improving Multi-Voltage Electrical System Performance with Smart Step-Down Converters*, Mar. 28, 2017, 6 pages.

*Primary Examiner* — Pinping Sun
(74) *Attorney, Agent, or Firm* — Frank Lollo; Eversheds Sutherland (US) LLP

(57) ABSTRACT

Systems devices and methods are disclosed for a vehicle power distribution system having a flat wire harness with integrated voltage converters. An example power distribution system includes a battery having a nominal voltage, a plurality of electrical loads, each corresponding to a respective rated voltage, and a flat wire harness. The flat wire harness includes a plurality of wire branches, each configured to couple the battery to a respective electrical load. The flat wire harness also includes a plurality of voltage converters, each integrated into a respective wire branch, configured to provide the respective rated voltage to each electrical load.

16 Claims, 2 Drawing Sheets

(56) References Cited

U.S. PATENT DOCUMENTS

| | | | |
|---|---|---|---|
| 2016/0059807 A1* | 3/2016 | Iwasaki | B60R 16/03 |
| | | | 307/10.1 |
| 2016/0288619 A1* | 10/2016 | Andrews | B60H 1/00428 |
| 2016/0304041 A1* | 10/2016 | Lennevi | B60L 50/10 |
| 2017/0036620 A1* | 2/2017 | Nagahashi | B60R 16/0215 |
| 2017/0158062 A1* | 6/2017 | Emrani | B60L 58/14 |
| 2017/0282819 A1* | 10/2017 | Emrani | H02H 3/202 |
| 2018/0281994 A1* | 10/2018 | De Payrebrune | H02S 40/44 |
| 2019/0068069 A1* | 2/2019 | Sheng | H02M 3/07 |
| 2019/0118739 A1* | 4/2019 | Takamatsu | B60R 16/033 |

\* cited by examiner

INTEGRATED FLAT WIRE POWER DISTRIBUTION SYSTEM FOR A VEHICLE

TECHNICAL FIELD

The present disclosure generally relates to vehicle power distribution and, more specifically, systems and devices for providing rated voltages to a plurality of electrical loads via a flat wire harness with integrated voltage converters.

BACKGROUND

Existing vehicles typically include low voltage power distribution systems to power a wide variety of vehicle components and accessories. For example, automotive vehicle applications may include a 12 volt power distribution system to power vehicle control modules, such as a powertrain controller, body controller, battery controller, and the like, as well as vehicle lighting, HVAC, windows, mirrors, wipers, infotainment system, navigation system, and countless other systems, motors, actuators, sensors, and modules. The increasing demands on vehicle power distribution systems are nearing the practical limits of existing 12 V systems. As a result, the automotive industry has been moving towards using higher voltage levels, such as 48 volts. However, certain vehicle accessories, components, or devices may not be compatible with a new, higher voltage. Thus, any new power distribution system must be able to accommodate higher voltage loads as well as lower voltage loads.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are shown describing systems and devices for providing rated power to one or more electrical loads. An example disclosed vehicle power distribution system includes a battery having a nominal voltage, a plurality of electrical loads, each corresponding to a respective rated voltage, and a flat wire harness. The flat wire harness includes a plurality of wire branches, each configured to couple the battery to a respective electrical load. The flat wire harness also includes a plurality of voltage converters, each integrated into a respective wire branch, configured to provide the respective rated voltage to each electrical load.

An example disclosed flat wire harness for vehicle power distribution includes a plurality of wire branches, each configured to couple a battery having a nominal voltage to a respective electrical load of a plurality of electrical loads. The flat wire harness also includes a plurality of voltage converters, each integrated into a respective wire branch, configured to provide a respective rated voltage to each electrical load.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
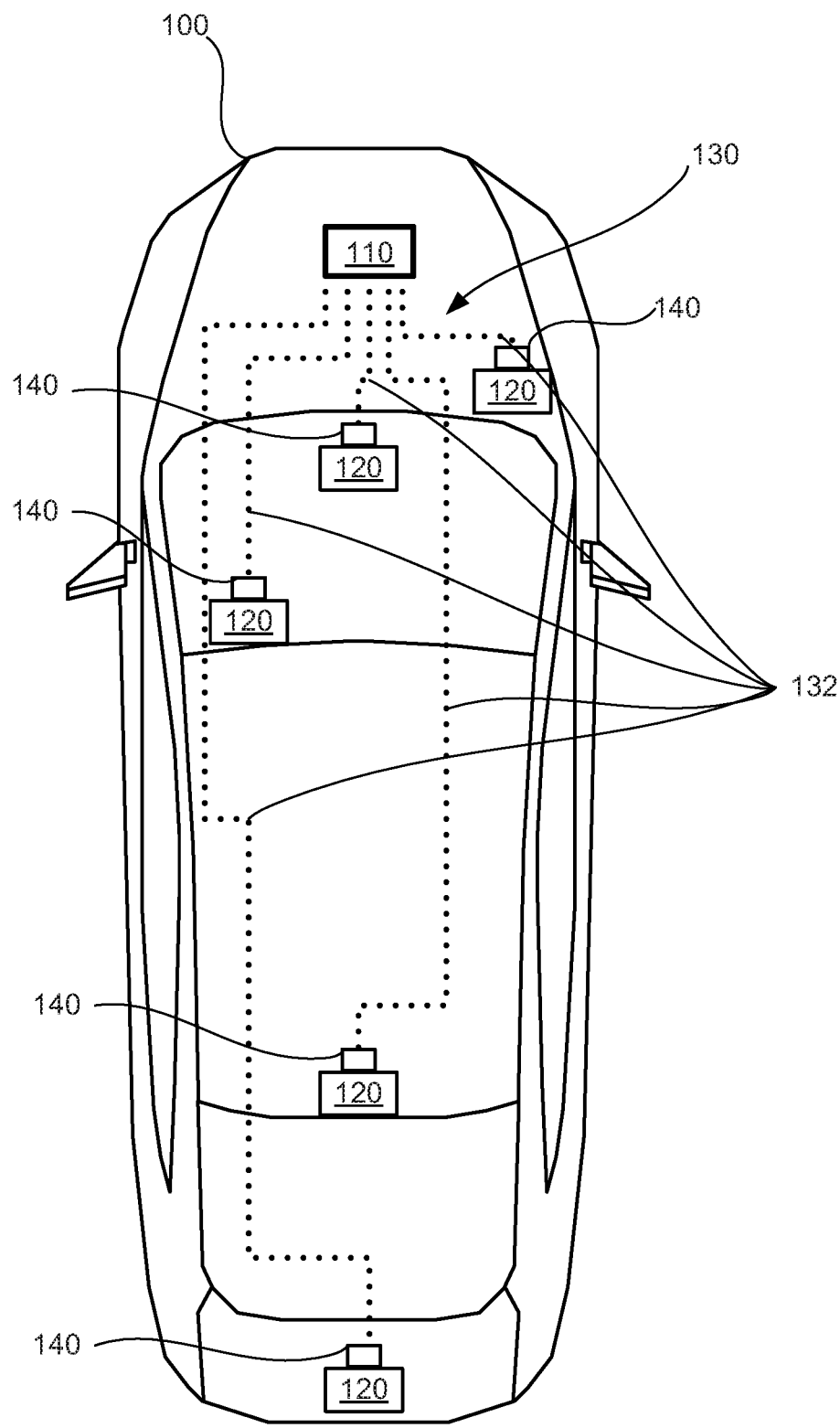
FIG. 1 illustrates an example vehicle and power distribution system according to embodiments of the present disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

As noted above, many vehicles include low voltage power distribution systems for powering low voltage electrical loads. But with the increased use of higher voltages for vehicle systems, there is a need for an efficient power distribution system that can power both high voltage and low voltage systems. Examples disclosed herein may provide systems and devices that can make use of a high voltage power source to power both high voltage and low voltage loads. This can decrease the manufacturing costs, decrease the physical space taken up by power systems, and generally create a better, more efficient vehicle system.

FIG. 1 illustrates an example vehicle 100 and power distribution system according to embodiments of the present disclosure. Vehicle 100 may be a standard gasoline powered vehicle, a hybrid vehicle, an electric vehicle, a fuel cell vehicle, or any other mobility implement type of vehicle. Vehicle 100 may be non-autonomous, semi-autonomous, or autonomous. Vehicle 100 may include parts related to mobility, such as a powertrain with an engine, a transmission, a suspension, a driveshaft, and/or wheels, etc. In the illustrated example, vehicle 100 may include one or more electronic components such as those described herein.

As shown in FIG. 1, the vehicle power distribution system may include a battery or other power source 110, a plurality of electrical loads 120, and a flat wire harness 130. The power distribution system may include one or more additional electronic components as well (not shown).

Battery 110 may be any type of stored energy device. According to some embodiments, battery 110 may be an auxiliary battery having a nominal voltage, such as, for example, 48 V or higher. As understood by those of ordinary skill in the art, the actual voltage supplied by the battery 110 will vary during operation depending on a number of ambient and operating conditions such as temperature, battery charge, current, battery age, etc. Battery 110 may also be referred to as a low-voltage battery, starter battery, or simply, the vehicle battery, for example, in vehicles without a high-voltage battery or high voltage power source.

Battery 110 may be used to power various low-voltage components, controllers, modules, motors, actuators, sensors, lights, and other electronics from various vehicle systems and subsystems. In FIG. 1, these various devices are generally represented as the electrical loads 120, which may be dispersed throughout the vehicle 100. Each electric load 120 may be associated with a rated voltage or supply voltage that is the same as or different from the nominal voltage of the battery 110. For example, a number of the electric loads 120 may have rated voltages that are the same as the nominal voltage (e.g., 48 V), while the remaining electric loads 120 may have rated voltages that are less than the nominal voltage (e.g., 6 V, 12 V, 24 V, etc.).

Flat wire harness 130 may be a wire assembly, structure, or other wire apparatus configured to provide power from the power source 110 to the plurality of electrical loads 120. In some examples, flat wire harness 130 may include a plurality of wire branches 132, each configured to provide power to a selected electrical load 120 or subset of electrical loads. In some cases, a single wire branch 132 may provide power to two or more electrical loads 120.

One or more of the wire branches 132 may include an integrated voltage converter 140. Each voltage converter 140 may be integrated into a respective wire branch 132 of the flat wire harness 130, and may be configured to provide a respective rated voltage to an electrical load 120.

In some examples, one or more of the plurality of wire branches may have a first end coupled to the battery and a second end coupled to a respective electrical load, wherein a corresponding integrated voltage converter is integrated proximate the second end. In this manner, the voltage converters 140 may be placed or located near the end of the wire branch closest to the particular electrical load. This may allow a large portion of the wiring of the power distribution system to be selected with high voltage characteristics in mind (e.g., the wire gauge, insulation, etc.), leaving only a relatively small portion at the end of the wire branch(s) nearest the electrical load as requiring low voltage characteristics.

In some embodiments, one or more of the voltage converters may include circuitry for providing fault protection, for supplying the rated voltage associated with the electric load 120 corresponding to the voltage converter 140, and for switching the electric load 120 on and off, as needed. For example, each voltage converter 140 can include an electronic fuse comprising a solid-state power switch (e.g., field-effect transistor (FET)) and integrated fault sensing circuitry, an integrated step-down converter for converting the nominal voltage to a lower rated voltage, as needed, and/or an electronic controller for setting the output voltage of the step-down converter and/or for controlling operation of the electronic fuse. In some examples, the electronic fuse may include an operational characteristic that is based on a corresponding electrical load (e.g., a level of current at which the fuse "trips").

In some examples, one or more voltage converters may comprise a monolithic solid state structure, such as a solid state integrated circuit. The number of voltage converters 140 may depend on the number of wire branches 132 and/or electrical loads 120.

In some examples, each voltage converter 140 may include pulse width modulation (PWM) circuitry configured to step-down the nominal voltage to a rated voltage of an electrical load. The PWM circuitry may operate with a duty cycle based on the intended output rated voltage. For instance, if the battery provides a 48V output, the duty cycle of the PWM circuitry may be set to 25% where the rated voltage requirement of the electrical load is 12V. Other duty cycles and rated voltages can be used as well.

In some examples, the exact components, circuitry, and configuration of a the voltage converters 140 may vary depending on the specification for one or more electrical loads 120. For example, the contents of each voltage converter 140 can be selected based on whether the associated electric load 120 (1) needs to be connected to the battery 110 at all times, (2) requires frequent on/off cycles, (3) requires a constant output voltage, (4) has a rated voltage that is less than the nominal voltage of the battery 110, or any other device specifications relevant to determining the power supply needs of the electric load 120. As will be appreciated, if all of the electric loads 120 have identical device specifications, all of the voltage converters 140 may be identical as well. Conversely, if each of the electric loads 120 has different device specifications, each of the voltage converters 140 may be different.

In some examples, the power distribution systems of this disclosure may further include a processor and/or memory. The processor may control and monitor one or more operational characteristics of the power distribution system, such as whether a fuse has been tripped and whether a given load is on or off, for example. The processor may further be able to control one or more voltage converters, by changing or modifying a PWM duty cycle, for example.

In some examples, the processor can be configured to control an output voltage, set and monitor fault condition limits, and control other operations of each voltage converter 140. In some cases, the processor can also monitor an overall condition of the vehicle 100 and/or the flat wire harness 130 in order to optimize system performance, for example, by identifying conditions that could lead to potential power savings. To carry out these and other functions, the processor can be configured to receive and/or transmit signals.

The processor may be configured to receive control messages for setting an output voltage of one or more voltage converters 140, switching one or more electric loads 120 on or off, and/or other actions. The processor can also receive fault condition limits for one or more of the voltage converters 140. In addition, the processor can output status messages regarding a fault condition of the voltage converters 140 and/or the flat wire harness 130 as a whole.

The processor can comprise one or more of a microprocessor, a microcontroller, a programmable logic array, an application-specific integrated circuit, a logic device, or other electronic device for processing, inputting, outputting, manipulating, storing, or retrieving data. The processor can be configured to execute software stored within a memory, to communicate data to and from the memory, and to generally control operations of the flat wire harness 130 pursuant to the software.

The memory can be included in flat wire harness and/or voltage controllers 140, along with the processor, or can be separate. The memory can comprise one or more of electronic memory, nonvolatile random access memory (e.g., RAM), flip-flops, a computer-writable or computer-readable storage medium, or other electronic device for storing, retrieving, reading, or writing data.

The memory may be configured to store executable software. The software in the memory may include one or more separate programs, each comprising an ordered listing of machine readable instructions that, when executed by the processor, cause the processor to perform various acts and/or implement logical functions. As an example, the software in the memory may include software instructions for setting fault condition limits for each voltage converter 140, monitoring a fault status of each voltage converter 140 and outputting said fault status via a display of vehicle 100, controlling operation of each voltage converter 140 in accordance with control messages received by the processor, setting an output voltage or PWM characteristic for one or more of the voltage converters 140 in accordance with a user-selected voltage value or an electrical load requirement.

Figure 2:
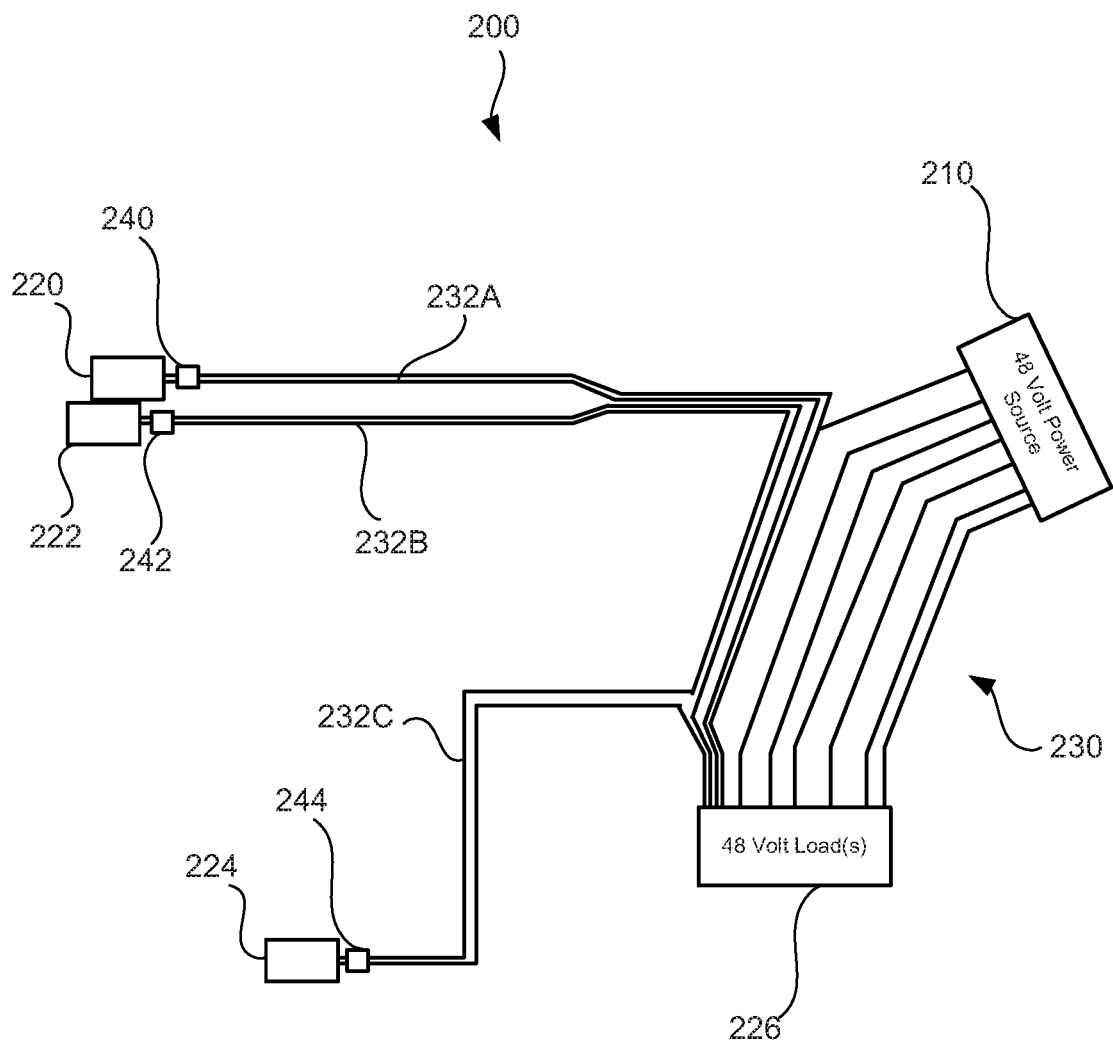
FIG. 2 illustrates an example flat wire harness according to embodiments of the present disclosure.

FIG. 2 illustrates an example simplified vehicle power distribution system 200 according to embodiments of the present disclosure. Power distribution system 200 may include a power source 210, a plurality of electrical loads 220, 222, 224, and 226, and a flat wire harness 230. The flat wire harness may include a plurality of wire branches 232A-C, and a plurality of voltage converters 240 integrated into the wire branches.

The power source 210 is illustrated as a 48V power source in FIG. 2. However it should be noted that any voltage power source may be used.

The plurality of electrical loads 220, 222, 224, and 226 may have different corresponding rated voltages, such as 6, 12, 26, and 48 volts respectively. In some examples, one or more electrical loads may have the same rated voltage.

In some examples, one or more of the voltage converters may be designed or may have operational characteristics based on a corresponding electrical load. For instance, in FIG. 2 a first wire branch 232A having a first integrated voltage converter 240, coupled to a first electrical load 220 having a first rated voltage. FIG. 2 also shows a second wire branch 232B having a second integrated voltage controller 242, coupled to a second electrical load 222 having a second rated voltage. In some examples, the first rated voltage may be different than the second rated voltage. Further, the first voltage converter 240 may be configured to convert from the nominal voltage to the first rated voltage with a greater efficiency than from the nominal voltage to the second rated voltage. And similarly, the second voltage converter 242 may be configured to convert from the nominal voltage to the second rated voltage with a greater efficiency than from the nominal voltage to the first rated voltage. Still further, the operational characteristics of voltage converter 240 may be different from those of voltage converter 242. For instance, voltage converter 240 may have a different duty cycle.

In some examples, one or more of the voltage converters may include voltage sense circuitry and/or current sense circuitry for monitoring a performance of the voltage converter and providing over-voltage and over-current protection, respectively.

The systems, devices, and circuitry described herein may include any number of discrete passive and active components that are not explicitly listed herein, such as, for example, resistors, capacitors, transistors, amplifiers, analog/digital converters (ADC or A/D converters), microprocessors, integrated circuits, non-transitory memory devices (e.g., FLASH, random access memory (RAM), read only memory (ROM), electrically programmable read only memory (EPROM), electrically erasable programmable read only memory (EEPROM), or other suitable variants thereof), and software which cooperates with one another to perform operation(s) disclosed herein.

Thus, the disclosure provides an integrated vehicle power distribution system comprising a flat wire harness having a plurality of wire branches, and a plurality of voltage converters integrated in to the wire branches. The systems and devices described herein not only save space and reduce the weight and size of the power distribution system, but also provide high system flexibility and functionality by optimizing the wiring system. For example, the voltage converters can be placed near the electrical loads, to provide reduced power loss in transmission of power to the loads from the power source. Further, the plurality of voltage converters allows each load to have a specially tailored voltage converter, removing the need for a single voltage converter that is efficient over a wide range of voltages. Each voltage converter can include solid-state power switches (e.g., FETs) and intelligence (e.g., electronic controllers and sensors) for providing resettable electronic circuit protection and monitoring configured to the device specifications of each electric load. In addition, select voltage converters can be configured to accommodate higher voltage electric loads having a rated voltage that is compatible with a higher voltage power source (e.g., a 48 V battery), while other voltage converters can include an integrated step-down converter, as needed to accommodate legacy electric loads having a rated voltage that is lower than the higher nominal voltage.

It should be emphasized that the above-described embodiments, particularly, any "preferred" embodiments, are possible examples of implementations, merely set forth for a clear understanding of the principles of the invention. Many variations and modifications may be made to the above-described embodiment(s) without substantially departing from the spirit and principles of the techniques described herein. All such modifications are intended to be included herein within the scope of this disclosure and protected by the following claims.

What is claimed is:

1. A vehicle power distribution system comprising: a battery having a nominal voltage; a plurality of electrical loads, each corresponding to a respective rated voltage; and a flat wire harness comprising:
   a plurality of wire branches, each of the plurality of wire branches having a first end coupled to the battery and a second end coupled to a respective electrical load; and a plurality of voltage converters, wherein each of the plurality of wire branches includes one of the plurality of voltage converters, and wherein each of the plurality of voltage converters are configured to provide the respective rated voltage to each of the plurality of electrical loads, wherein each of the plurality of voltage converters are integrated proximate the second end, wherein
   a first integrated voltage converter in a first wire branch is configured to convert to a first rated voltage with greater efficiency than to a second rated voltage, and
   a second integrated voltage converter in a second wire branch is configured to convert to the second rated voltage with greater efficiency than to the first rated voltage, wherein the first rated voltage is different than the second rated voltage.

2. The vehicle power distribution system of claim 1, wherein the nominal voltage is 48 volts.

3. The vehicle power distribution system of claim 1, wherein the respective rated voltage of at least one of the plurality of electrical loads is less than the nominal voltage.

4. The vehicle power distribution system of claim 1, wherein the plurality of voltage converters each comprises a fuse.

5. The vehicle power distribution system of claim 4, wherein each fuse has an operational characteristic based on a corresponding electrical load.

6. The vehicle power distribution system of claim 1, wherein the plurality of voltage converters each comprises a monolithic solid state integrated circuit.

7. The vehicle power distribution system of claim 1, wherein the plurality of voltage converters each comprises a pulse width modulation (PWM) circuit configured to step-down the nominal voltage from the battery.

8. The vehicle power distribution system of claim 1, wherein
the plurality of wire branches comprises:
the first wire branch having the first integrated voltage converter, coupled to a first electrical load having the first rated voltage; and
the second wire branch having the second integrated voltage converter, coupled to a second electrical load having the second rated voltage.

9. A flat wire harness for vehicle power distribution comprising:
a plurality of wire branches, each of the plurality of wire branches having a first end coupled to a battery having a nominal voltage and a second end coupled to a respective electrical load of a plurality of electrical loads; and
a plurality of voltage converters, wherein each of the plurality of wire branches includes one of the plurality of voltage converters, and wherein each of the plurality of voltage converters are configured to provide a respective rated voltage to each of the plurality of electrical loads, wherein each of the plurality of voltage converters are integrated proximate the second end,
wherein a first integrated voltage converter in a first wire branch is configured to convert to a first rated voltage with greater efficiency than to a second rated voltage, and
a second integrated voltage converter in a second wire branch is configured to convert to the second rated voltage with greater efficiency than to the first rated voltage, wherein the first rated voltage is different than the second rated voltage.

10. The flat wire harness of claim 9, wherein the nominal voltage is 48 volts.

11. The flat wire harness of claim 9, wherein the respective rated voltage of at least one of the plurality of electrical loads is less than the nominal voltage.

12. The flat wire harness of claim 9, wherein the plurality of voltage converters each comprises a fuse.

13. The flat wire harness of claim 12, wherein each fuse has an operational characteristic based on a corresponding electrical load.

14. The flat wire harness of claim 9, wherein the plurality of voltage converters each comprises a monolithic solid state integrated circuit.

15. The flat wire harness of claim 9, wherein the plurality of voltage converters each comprises a pulse width modulation (PWM) circuit configured to step-down the nominal voltage from the battery.

16. The flat wire harness of claim 9, wherein the plurality of wire branches comprises: the first wire branch having the first integrated voltage converter, coupled to a first electrical load having the first rated voltage; and
the second wire branch having the second integrated voltage converter, coupled to a second electrical load having the second rated voltage.

* * * * *